United States Patent [19]
Xu et al.

[11] Patent Number: 5,715,432
[45] Date of Patent: Feb. 3, 1998

[54] METHOD AND SYSTEM FOR DEVELOPING NETWORK ANALYSIS AND MODELING WITH GRAPHICAL OBJECTS

[75] Inventors: Jiyang Xu, Superior; Louis A. Cox, Jr., Denver; Michael L. Epstein, Boulder, all of Colo.

[73] Assignee: U S West Technologies, Inc., Boulder, Colo.

[21] Appl. No.: 416,423

[22] Filed: Apr. 4, 1995

[51] Int. Cl.⁶ .................................................. G06F 3/00
[52] U.S. Cl. .................... 395/500; 395/702; 345/349; 345/356; 345/967
[58] Field of Search ................... 395/155–161, 395/200.01–200.21, 700, 500, 326–358, 968, 967, 970, 701–705; 364/578, 488

[56] References Cited

U.S. PATENT DOCUMENTS

| | | | |
|---|---|---|---|
| 4,656,603 | 4/1987 | Dunn | 395/161 |
| 5,226,120 | 7/1993 | Brown et al. | 395/161 |
| 5,276,789 | 1/1994 | Besaw et al. | 395/161 |
| 5,295,244 | 3/1994 | Dev et al. | 395/161 |
| 5,394,522 | 2/1995 | Sanchez-Frank et al. | 395/159 |
| 5,432,903 | 7/1995 | Frid-Nielsen | 395/161 |

OTHER PUBLICATIONS

Mosley, "LabView Upgrade Reduces Execution Time and Enhances Editing and Graphics Controls", EDN, p. 136, Sep. 15, 1988.

Vazquez et al., "Graphical Interface for Communication Network Analysis and Simulation", IEEE, pp. 1109–1112, 1991.

Bachmann et al., "NetMod: A Design Tool for Large-Scale Heterogeneous Campus Networks", IEEE Journal on Selected Areas in Communications, vol. 9, No. 1, pp. 15–24, Jan. 1991.

Chang et al., "Design, Implementation, and Applications for a B-ISBN Simuation Testbed", IEEE, pp. 212–219, 1995.

Carr, "Networks by Deisgn", LAN Magazine, pp. 38–40, 43–44, 46, 48, Nov. 1990.

Dahler et al., "A Graphical Tool for the Design and Prototyping of Distributed Systems", IEEE, pp. 123–129, Mar. 1988.

*Primary Examiner*—John E. Breene
*Attorney, Agent, or Firm*—Brooks & Kushman

[57] ABSTRACT

A method for developing a network analysis and modeling application program includes the step of interactively selecting and displaying a graphical object. An instantiation of the graphical object is representative of at least a portion of a network. The graphical object is further used in an executable network analysis and modeling application program. The preferred embodiment further includes the step of editing the selection of the graphical object.

6 Claims, 2 Drawing Sheets

METHOD AND SYSTEM FOR DEVELOPING NETWORK ANALYSIS AND MODELING WITH GRAPHICAL OBJECTS

TECHNICAL FIELD

This invention relates generally to methods and systems for developing computerized applications for analyzing and modeling networks.

BACKGROUND ART

For years, applications have been developed for analyzing and modeling telecommunication and other networks. With the introduction of expanded information services, the need for such applications continues to increase.

Because network analysis and modeling often requires the collection of specific network data and knowledge of advanced mathematics, applications to perform such functions have traditionally been custom designed. Many of these custom applications were developed using graphical user interface ("GUI") application building tools such as Visual C++, XVT and MacApp.

Recently, however, network analysis tools such as NetPad and MIMI have become available. These tools are designed for analyzing some classes of specific network problems, but cannot be used in all implementations due to their closed architectures.

Presently, development of network analysis and modeling applications is limited by the available development tools. GUI application builders provide only general low-level support for applications development and require extensive GUI programming knowledge. Even though network analysis tools address a number of network problems, they only address a small portion of the network problems currently in practice. Further, they fail to address the variety of different user interface requirements and cannot be generally embedded in applications.

DISCLOSURE OF THE INVENTION

A need exists for an improved method and system for developing computerized network analysis and modeling applications. More particularly, a need exists for a development tool including not only the low level support found in GUI application builders but also additional special network analysis and modeling interfaces.

The present invention described and disclosed herein comprises a method and system for developing computerized network analysis and modeling applications.

It is an object of the present invention to provide a method and system for developing computerized network analysis and modeling applications which include an application development environment, tool set and re-usable component library.

It is another object of the present invention to provide a method and system for developing computerized network analysis and modeling applications which include network problem domain analysis and design procedures.

In carrying out the above objects and other objects of the present invention, a first method is provided for developing an object-oriented network analysis and modeling application program. The first method includes the step of interactively selecting and displaying a graphical representation of at least a portion of the network to be modeled. The interactive nature of this step allows modification to the object to be implemented without requiring recompilation and relinking of an entire application.

In further carrying out the above objects and other objects of the present invention, a second method is provided for developing an object-oriented network analysis and modeling application program. The second method includes the step of interactively editing a user selection of objects for graphically representing at least a portion of the network to be modeled. This step is based on editing a source program and is performed during the development of the program, but before compiling and linking.

In the preferred embodiment, the objects are selected from a pre-defined library of objects specifically designed for the development of network analysis and modeling applications. The pre-defined library of objects may include graphs, charts, tables, and rings for synchronous optical networks ("SONETs").

In further carrying out the above objects and other objects of the present invention, a third method is provided for developing an object-oriented network analysis and modeling application program. The third method includes the step of providing a library of data interface routines for acquiring data related to network analysis and modeling.

The third method further includes the step of interactively editing a source program to include at least one of the data interface routines. This step is performed during the development of the program, but prior to compiling and linking.

Finally a fourth method is provided for developing an object-oriented network analysis and modeling application program. The fourth method includes the step of providing an external algorithm interface routine for computationally intensive processing related to network analysis and modeling.

The fourth method also includes the step of interactively editing a source program to include a command to invoke the external algorithm interface routine. This step is performed during the development of the program, but prior to compiling and linking.

In further carrying out the above objects and other objects of the present invention, systems are also provided for carrying out the steps of each of the above described methods.

The objects, features and advantages of the present invention are readily apparent from the detailed description of the best mode for carrying out the invention when taken in connection with the accompanying drawings.

BRIEF DESCRIPTION OF THE DRAWINGS

A more complete appreciation of the invention and many of the attendant advantages thereof may be readily obtained by reference to the following detailed description when considered with the accompanying drawings in which reference characters indicate corresponding parts in all of the views, wherein.

BEST MODES FOR CARRYING OUT THE INVENTION

Figure 1:
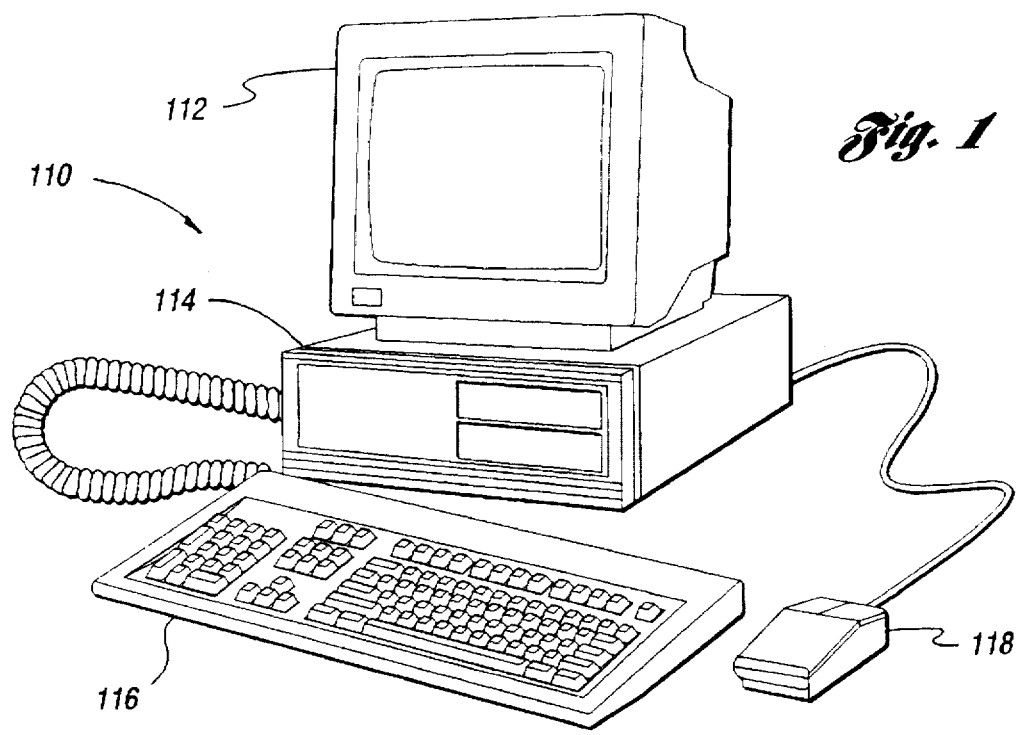
FIG. 1 is a block diagram of one hardware environment in which the present invention may be implemented.

Referring now to the drawings, FIG. 1 illustrates computer system 110 on which the present invention can be implemented. Computer system 110 includes an operating system employing a graphical user interface ("GUI") such as Windows which are commercially available from Microsoft or Windows from MIT.

Computer system 110 may be, for example, an IBM compatible system or a Sun Sparc workstation. Computer system 110 includes a chassis 114, a monitor 112, a keyboard 116 and a mouse 118.

Chassis 114 houses a CPU, disk drives, random access memory and other components not specifically illustrated. Chassis 114 also includes a text editor, a graphics editor, a C or C++ compiler, an assembler and other utilities to assist a GUI application developer.

Using computer system 110, a person who develops computer applications, commonly referred to as an application developer, is able to develop an application program for analyzing and modeling networks. Traditionally, developing such an application has been accomplished using conventional GUI tools. By employing utilities specifically directed toward the development of network modeling and analysis applications, such an application can be developed more efficiently.

Figure 2:
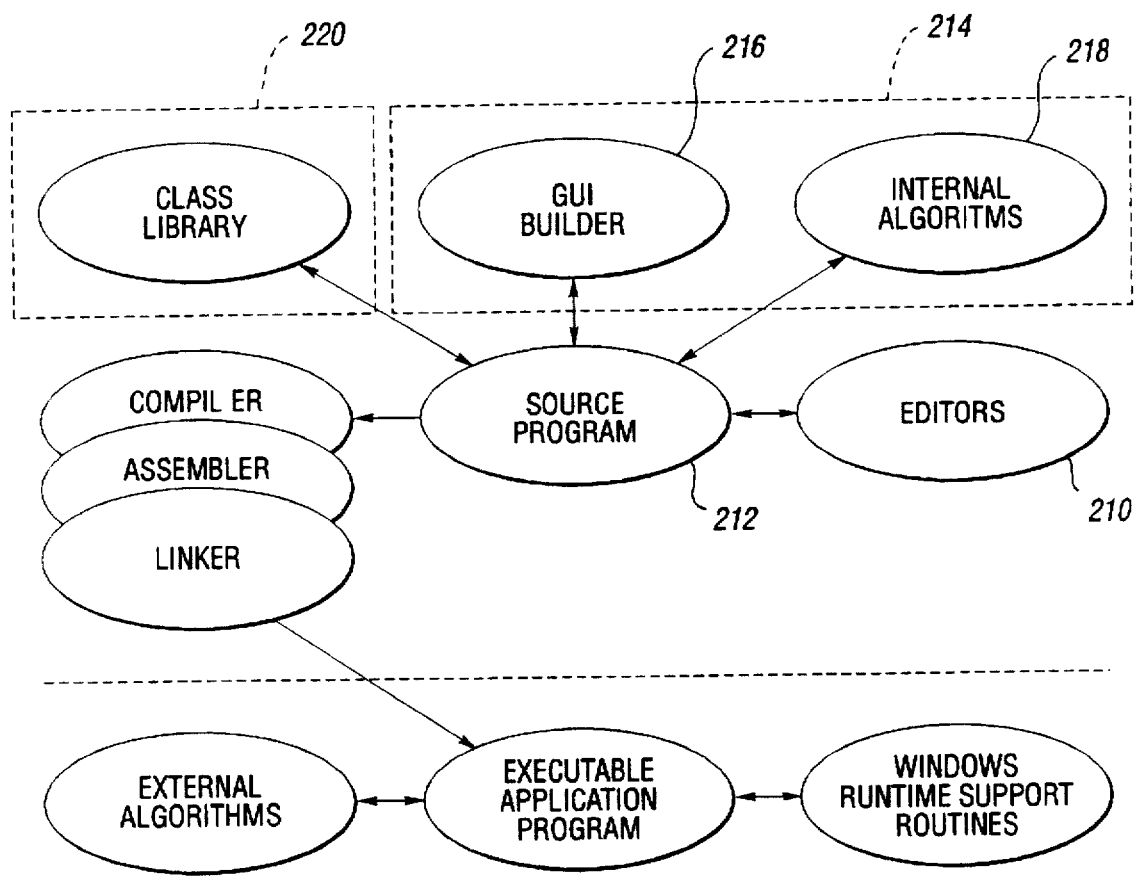
FIG. 2 is a functional block diagram illustrating the software components of the preferred embodiment.

Referring now to FIG. 2, there is illustrated the software components of the preferred network modeling and analysis application development environment. The software components of the preferred embodiment include standard development tools as well as specialized development tools, also referred to as meta-tools.

As illustrated, the preferred software environment includes source code 212 which is created by AppBuilder 214. Source code 212 can be modified by the application developer using AppBuilder 214 and standard text editors 210. Source code 212 represents the human-readable control logic of the network modeling and analysis application.

AppBuilder 214 includes a GUI builder 216 and a set of internal algorithms 218. Both GUI builder 216 and algorithms 218 are specifically designed to aid the development of network modeling and analysis applications. The specifics of GUI builder 216 and algorithms 218 are more fully described below.

A further software component included in the preferred development environment is the XuView class library 220. The XuView class library includes object definitions which can be regularly used to develop network modeling and analysis applications. These objects will be more fully described below.

Once source program 212 has been created using the above-referenced development tools, the developer employs various utilities to generate an executable application program 222. These utilities include a compiler 224, an assembler 226 and a linker 228.

Executable application program 222 represents all or part of the finished network modeling and analysis application. Executable application program 222 runs using the runtime support of the windows operating system and might invoke external algorithms provided by other manufacturers.

XuView

XuView 220 is a library of classes and procedures that implements an object-oriented environment and provides pre-built graphical objects as well as graphical and non-graphical network elements such as networks, SONET rings, and interfaces to external optimizers. That is, an instance of each of the classes are objects that represent at least a portion of a network. Like other high level GUI libraries such as Motif and XView, XuView provides pre-built GUI objects such as control panels, canvases, menus, scrollbars, buttons, file directories, text fields, colors, fonts and dialogs.

Unlike Motif and XView, XuView also provides primitives for rendering graphics directly in a canvas window, hence XuView is somewhat self-contained. To use Motif or XView, a developer needs to understand X Intrinsics and X Lib to create applications that render graphics of their own.

Further, XuView supports dynamic creation and modification of classes. In contrast, C++ supports only static classes and Motif XView provide no mechanism to easily create new classes.

XuView's self-contained nature, therefore, is a significant advantage. Furthermore, XuView is specifically designed to work with AppBuilder and hence includes features that makes AppBuilder simple but flexible and powerful.

Multiple Languages

The XuView library 220 is currently available in two different languages: C and C++. Further development of a Prolog XuView library is underway. Although other libraries such as Motif can be used with many languages as well, only one language is really native. For example, one cannot use the C++ operator "new" to create new objects in Motif. A Level of so-called "object-wrapper" is needed to give Motif a real C++ flavor.

XuView, on the other hand, is designed for the above mentioned two languages. Although a developer must still link with different libraries for each language, the developer does not need to find or write a wrapper, losing the efficiency of the native language. Internally, all libraries for all languages share the same source code, and any updates are reflected in all three languages.

AppBuilder

AppBuilder 214 provides an interactive environment for developing general purpose and network based interactive applications using XuView 220. AppBuilder 214 is itself an application with a graphical user interface similar to the GUIs which can be developed using AppBuilder 214.

AppBuilder includes all essential features of a general purpose GUI builder, including interactive graphical object creation, manipulation, and testing-while-building.

AppBuilder allows executable applications to be developed in C or C++. Using AppBuilder, C source files may be saved in either C or ANSI C format.

The pre-defined objects in XuView are organized around object-oriented concepts much like Motif. However, XuView goes beyond just a GUI library by not only built-in graphical and non-graphical network related objects, but also providing the developer the ability to easily create their own classes with user defined attributes. The AppBuilder 214 displays all classes in a tree form showing their inheritance relationship. Therefore, the developer can easily create subclasses and add attributes to them interactively. These features promote efficient object-oriented analysis and development, where classes can be created dynamically.

External Algorithms

In addition to typical procedures like callbacks, XuView 220 and AppBuilder 214 support external algorithms. The external algorithms are separate processes which can be thought of as callbacks in the form of independent programs. Data are passed between the application and the external algorithm using external storage such as files. Netpad provides only this type of callback and only network data in the form of graph objects can be passed between the application kernel and external algorithms. Since this type of callback has significant invocation overhead, callbacks are mainly suited for medium to large grain tasks. For example, a developer may implement graph algorithms such as solving a traveling salesman problem by means of external algorithms. External algorithms are typically more computation oriented rather than graphics-oriented.

The advantage of using external algorithms in place of internal callback procedures include:

- External algorithms require minimal knowledge of GUI development and are thus feasible for network modelers and inexperienced GUI programmers. Using external algorithms, modelers can focus their attention on writing algorithms with minimal knowledge of GUI programming.
- Since external algorithms are implemented as independent programs, debugging the algorithms can be separated from debugging the kernel as well as from each other. The tasks of debugging of a complicated application are thus greatly simplified.
- Applications using external algorithms are more robust than the corresponding applications using internal callbacks, because the GUI kernel can survive most fatal bugs in external algorithms.

XuView provides a general external algorithm interface that supports not only graph objects but also many other types of objects.

Figure 3:
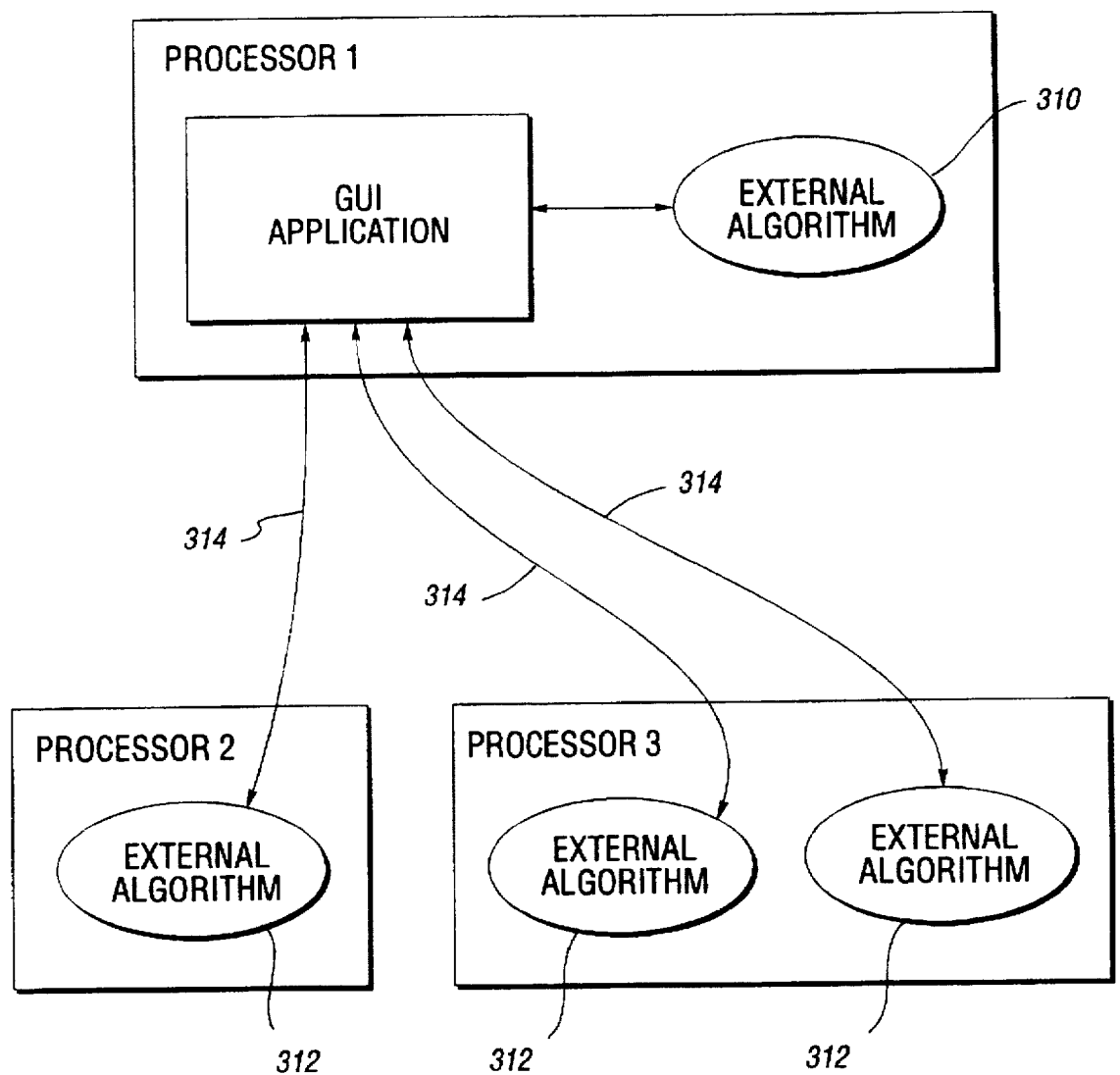
FIG. 3 is a functional block diagram illustrating the use of external algorithms.

Referring now to FIG. 3, there is shown a block diagram illustrating the use of external algorithms in accordance with the present invention. External algorithms 310,312 are independent executable programs which provide distributed computation.

The external algorithms 310,312 may reside on the same computer as the GUI application as illustrated at reference numeral 310 or it may reside on a different computer as illustrated at reference numeral 312. The external algorithms executed using a separate processor communicate with the GUI application using TCP/IP (Internet Protocol Communication) links, as illustrated at reference numeral 314. As shown, several external algorithms can run in series or in parallel, each executed by a different or the same processor.

Network Displays

The XuView library 220 provides built-in graph and network display objects that can be created and tested interactively using AppBuilder 214. These objects can display simple directed and undirected graphs, the simplest kinds of networks, as well as nested networks, hyper links, multiple links and multiple subnetworks.

"Nodes" in the network can be of different classes with different attributes and graphical representations, but they must be subclasses of the built-in object NODE. For example, a developer can easily create nodes representing central offices, hubs, cities, or homes and they can co-exist in the same network and its display. Similarly, "links" can be created representing different network entities such as demands between two cities or actual optical fibers.

Telecommunication networks can often be viewed as nested for both technical and conceptual reasons. Central offices, for instance, are nodes in the networks of trunks, but they also conceptually contain the local networks connecting the central offices to the homes they serve.

XuView network display objects can display not only a single level of networks but also several levels at a time. A typical usage of this feature is to expand a node in a level of network to display the subnetwork contained in it, coexisting with other nodes in the outer level.

In addition to networks themselves, there are other objects that are common in network analysis and modeling tools.

One example of such other object is a SONET ring, which is abstractly a group of nodes in an optical fiber network. Examples of such other objects include central offices, hubs and ADMs.

The XuView library 220 also provides a spreadsheet-type table displayer/editor for editing network data such as demands, equipment, cost information, routing information, and fibers. Like other GUI elements, and unlike spreadsheets, the table editor can be easily created and tuned for a particular application through XuView and AppBuilder.

Other graphical objects supported by XuView include trees, which are also common in modeling hierarchies of network elements.

Report Generation

Most network analysis tools generate reports as their output. Typically, these reports include graphical displays of networks, demands, equipment costs and coordinates. In addition to graphs and tables, XuView supports various kinds of charts as built-in objects. These charts include bar, line and pie charts. Using these built-in objects, the tasks of inclusion of report generation capabilities to applications are greatly simplified.

Optimization Support

XuView provides not only built-in optimization engines based on constraint logic programming techniques, but also an interface to external solvers. Both a rule based language and a mathematical formula based language is integrated to simplify greatly the development and implementation of network analysis algorithms.

Database Interface

Many of the input data for network modeling and analysis applications originate from databases currently in operation. Further data acquisition is often the most expensive and tedious part of using network modeling and analysis tools. AppBuilder 214 therefore supports a database interface. AppBuilder 214 includes internal algorithms 218 for database interfacing and provides support for external database interface algorithms 310 and 312. Database support not only simplifies the application development process but also provides an abstract layer so that the tools can easily be adapted to environments with different databases.

While the best mode for carrying out the invention has been described in detail, those familiar with the art to which this invention relates will recognize various alternative designs and embodiments for practicing the invention as defined by the following claims.

What is claimed is:

1. In an interactive computer system including a processor, a memory, an output device and an input device, a method for aiding the development of a network analysis and modeling application program, the method comprising:

providing a library of graphical object classes including a graph object for displaying network components, a table object for manipulating network data, a chart object for report generation, and a SONET object for modeling hierarchies of network elements, wherein instantiation of each of the graphical object classes represent a portion of a network related to network analysis and modeling;

interactively editing a source program to include at least one of the graphical object classes upon receiving a signal indicating a user selection of an object from said library;

compiling the source program; and linking the compiled source program to a selected set of objects to produce the executable network analysis and modeling application program.

2. The method of claim 1 wherein the step of interactively editing includes the steps of:

receiving signals indicating a level of detail desired by a user; and displaying a graphical representation of a portion of the network based on the desired level of detail.

3. The method of claim 1 wherein the set of objects are selected from the group of graph object, table object, chart object and SONET object.

4. In an interactive computer system including a processor, a memory, an output device and an input device, a system for aiding the development of a network analysis and modeling application program comprising:

means for providing a library of graphical object classes including a graph object for displaying network components, a table object for manipulating network data, a chart object for report generation, and a SONET object for modeling hierarchies of network elements, wherein instantiation of each of the graphical object classes represent a portion of a network related to network analysis and modeling;

means for interactively editing a source program to include at least one of the graphical object classes upon receiving a signal indicating a user selection of an object from said library;

means for compiling the source program; and means for linking the compiled source program to a selected set of objects to produce the executable network analysis and modeling application program.

5. The system of claim 4 wherein the means for interactively editing includes:

means for receiving signals indicating a level of detail desired by a user; and means for displaying a graphical representation of a portion of the network based on the desired level of detail.

6. The system of claim 4 wherein the set of objects are selected from the group of graph object, table object, chart object and SONET object.

* * * * *